US012132639B2

(12) United States Patent
Negi et al.

(10) Patent No.: US 12,132,639 B2
(45) Date of Patent: Oct. 29, 2024

(54) METHOD FOR OPTIMAL ROUTING IN AN INTER-AREA SRMPLS IGP NETWORK, NODES AND SYSTEM THEREOF

(71) Applicant: Huawei Technologies Co., Ltd., Shenzhen (CN)

(72) Inventors: Mahendra Singh Negi, Bengaluru (IN); Sreekanth Sreenivasan, Bengaluru (IN); Mobashshera Rasool, Bengaluru (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 17/479,129

(22) Filed: Sep. 20, 2021

(65) Prior Publication Data
US 2022/0006721 A1 Jan. 6, 2022

Related U.S. Application Data

(63) Continuation of application No. PCT/CN2020/080308, filed on Mar. 20, 2020.

(30) Foreign Application Priority Data

Mar. 20, 2019 (IN) .............................. 201931010956

(51) Int. Cl.
*H04L 45/02* (2022.01)
*H04L 45/12* (2022.01)
(Continued)

(52) U.S. Cl.
CPC ............ *H04L 45/04* (2013.01); *H04L 45/123* (2013.01); *H04L 45/121* (2013.01); *H04L 45/50* (2013.01)

(58) Field of Classification Search
CPC ...................................................... H04L 45/04
See application file for complete search history.

(56) References Cited

U.S. PATENT DOCUMENTS 8,254,272 B1 8/2012 Vasseur
8,611,359 B1 12/2013 Kompella et al.
(Continued)

FOREIGN PATENT DOCUMENTS

CN 101036355 A 9/2007
CN 101227403 A 7/2008
(Continued)

OTHER PUBLICATIONS

Talaulikar, K. et al., "Flexible Algorithm Definition Advertisement with BGP LinkState"; draft-ketant-idr-bgp-ls-flex-algo-01, Feb. 22, 2019, pp. 1-10.
(Continued)

*Primary Examiner* — Guang W Li
(74) *Attorney, Agent, or Firm* — Slater Matsil, LLP

(57) ABSTRACT

A method of optimal routing in an inter-area IGP network based on SR-MPLS Flex-Algorithm procedures, a source node, an area border node and a system thereof are disclosed. The method comprises advertising, by each of the at least two area border nodes of the IGP network comprising a first area and second area, an algorithm-specific metric associated with a destination node from the first set of nodes of the first area to a source node from the second set of nodes of the second area; calculating, by the source node, each inter-area path metric associated with a path including a respective area border node to reach the destination node; and determining, by the source node, an optimal path including one of the at least two area border nodes to reach the destination node based on each of the each calculated inter-area path metric.

20 Claims, 7 Drawing Sheets

(51) Int. Cl.
  *H04L 45/121*   (2022.01)
  *H04L 45/50*    (2022.01)

(56) References Cited

U.S. PATENT DOCUMENTS

| | | | | |
|---|---|---|---|---|
| 8,958,286 | B1* | 2/2015 | Atlas | H04L 12/18 |
| | | | | 370/227 |
| 9,100,328 | B1 | 8/2015 | Atlas | |
| 10,097,449 | B2* | 10/2018 | Patel | H04L 67/10 |
| 10,469,360 | B1* | 11/2019 | Bhat | H04L 45/12 |
| 2001/0017845 | A1* | 8/2001 | Bauer | H04L 45/04 |
| | | | | 370/241 |
| 2006/0039391 | A1* | 2/2006 | Vasseur | H04L 45/48 |
| | | | | 370/395.5 |
| 2007/0159984 | A1 | 7/2007 | Hentschke et al. | |
| 2008/0219272 | A1* | 9/2008 | Novello | H04L 45/04 |
| | | | | 370/389 |
| 2010/0042563 | A1 | 2/2010 | Livingston et al. | |
| 2010/0260177 | A1* | 10/2010 | Wu | H04L 45/04 |
| | | | | 370/389 |
| 2011/0235545 | A1* | 9/2011 | Subramanian | H04L 45/04 |
| | | | | 370/254 |
| 2013/0100817 | A1* | 4/2013 | Oltman | H04L 45/42 |
| | | | | 370/252 |
| 2013/0163983 | A1* | 6/2013 | Skoog | H04J 14/0284 |
| | | | | 398/5 |
| 2014/0129735 | A1* | 5/2014 | Thyni | H04L 45/124 |
| | | | | 709/241 |
| 2014/0269699 | A1 | 9/2014 | Filsfils et al. | |
| 2016/0248658 | A1* | 8/2016 | Patel | H04L 45/04 |
| 2016/0248663 | A1* | 8/2016 | Patel | H04L 45/24 |
| 2017/0289027 | A1* | 10/2017 | Ratnasingham | H04L 45/507 |
| 2018/0254972 | A1* | 9/2018 | Patel | H04L 45/74 |
| 2019/0007305 | A1* | 1/2019 | Filsfils | H04L 45/44 |
| 2019/0334650 | A1* | 10/2019 | Zhang | H04L 45/123 |
| 2020/0162371 | A1* | 5/2020 | Musku | H04L 45/54 |
| 2020/0244588 | A1* | 7/2020 | Filsfils | H04L 41/12 |
| 2021/0168065 | A1* | 6/2021 | Li | H04L 47/12 |
| 2021/0258249 | A1* | 8/2021 | Torvi | H04L 45/566 |
| 2022/0006721 | A1* | 1/2022 | Negi | H04L 45/04 |
| 2022/0368703 | A1* | 11/2022 | Jiang | G06N 20/00 |
| 2023/0119919 | A1* | 4/2023 | Uttaro | H04L 45/04 |
| | | | | 709/238 |

FOREIGN PATENT DOCUMENTS

| | | | |
|---|---|---|---|
| CN | 101465793 | A | 6/2009 |
| CN | 105052090 | A | 11/2015 |
| CN | 106254241 | A | 12/2016 |
| CN | 107409092 | A | 11/2017 |
| EP | 2413540 | A1 | 2/2012 |
| JP | 2016524383 | A | 8/2016 |
| WO | 2009106012 | A1 | 9/2009 |

OTHER PUBLICATIONS

Okamoto, S. et al., "A Study on Policy Control Methods for GMPLS-based Multi-domain Connection" (with an English abstract), The Institute of Electronics, Information and Communication Engineers, Aug. 31, 2009, 4 pages.

Przygienda, T. et al., "M-ISIS: Multi Topology (MT) Routing in Intermediate System to Intermediate Systems (IS-ISs)", Network Working Group, RFC 5120, Feb. 2008, 14 pages.

Psenak, P et al., "OSPFv2 Prefix/Link Attribute Advertisement", Internet Engineering Task Force (IETF), RFC 7684, Nov. 2015, 15 pages.

Hopps, C., "Routing IPv6 with IS-IS", Network Working Group, RFC 5308, Oct. 2008, 7 pages.

Li, T. et al., "IS-IS Extensions for Traffic Engineering", RFC 5305, Oct. 2008, 17 pages.

Psenak, P. et al., "IGP Flexible Algorithm"; draft-ietf-lsr-flex-algo-01.txt, Network Working Group, Nov. 12, 2018, 23 pages.

Previdi, S. et al., "IS-IS Extensions for Segment Routing"; draft-ietf-isis-segment-routing-extensions-21, IS-IS for IP Internets, Dec. 3, 2018, 34 pages.

Psenak, P. et al., "OSPFv3 Extensions for Segment Routing"; draft-ietf-ospf-ospfv3-segment-routing-extensions-20, Open Shortest Path First IGP, Dec. 3, 2018, 20 pages.

Lindem, A. et al., "OSPFv3 Link State Advertisement (LSA) Extensibility", Internet Engineering Task Force (IETF), RFC8362, Apr. 2018, 33 pages.

3GPP TR 23.780 V1.2.0, 3rd Generation Partnership Project; Technical Specification Group Services and System Aspects; Study on Multimedia Broadcast and Multicast Service (MBMS) usage for mission critical communication services (Release 14), May 2, 2017, total 93 pages.

Yaping Liu et al, AS Egress Selection Optimization Based On Link States, IEEE Xplore, Feb. 12, 2007, total 6 pages.

Jiang Dong, Research on Network Topology Discovery and Display Technology, CNKI China hownet, Nov. 15, 2013, with the English Abstract, total 68 pages.

Chen Xinzhi, Research of Routing Protocols of Smart Network Based on Intelligent Terminal, CNKI China hownet, Mar. 15, 2017 with the English Abstract, total 69 pages.

* cited by examiner

METHOD FOR OPTIMAL ROUTING IN AN INTER-AREA SRMPLS IGP NETWORK, NODES AND SYSTEM THEREOF

CROSS-REFERENCE TO RELATED APPLICATIONS

This application is a continuation of International Application No. PCT/CN2020/080308, filed on Mar. 20, 2020, which claims priority to Indian Patent Application No. IN201931010956, filed on Mar. 20, 2019. The disclosures of the aforementioned applications are hereby incorporated by reference in their entireties.

TECHNICAL FIELD

The present subject matter described herein, in general, relates to a segment routing and more particularly to segment routing-flexible algorithm solutions for inter-area IGP (Interior Gateway Protocol) network.

BACKGROUND

Segment routing (SR) divides the network into "segments" where each node and link could be assigned a segment identifier, or a SID, which gets advertised by each node using standard routing protocol extensions (such as, ISIS/OSPF or BGP), eliminating the need to run additional label distribution protocols. A prefix SID represents a prefix segment attached to an Interior Gateway Protocol (IGP) prefix. Further, the IP loopback address can be used to distinguish the SR nodes from each other within the provider system. Packets addressed with given SID typically travel along the shortest path, for example, the shortest path to a network node associated with the SID. The loopback addresses can be used by link-state protocols such as open shortest path first (OSPF) or intermediate system to intermediate system (IS-IS) or modifications, therefore, operating in a control pane of an SR node (nodes employing SR) to identify egress interfaces for the shortest path of respective nodes. SR nodes can advertise their SIDs in the provider network using one or more protocols such as the interior gateway protocol (IGP).

IGP protocols traditionally compute best paths over the network based on the IGP metric assigned to the links. In many cases, traffic engineering (TE) can cause packets to be forwarded along a path other than the shortest path. Many network deployments use RSVP-TE based or Segment Routing based traffic engineering to enforce traffic over a path that is computed using different metrics or constraints than the shortest IGP path. TE constraint-based paths need to be installed in the forwarding tables in addition to, or as a replacement of the paths computed by IGP. SR-TE policy paths are a list of segment-identifiers (SIDs), MPLS label-stack is derived from the segment-list. TE constraints are given a name Flexible Algorithm Definition (FAD) and advertised in IGPs, which enables IGPs to compute constraint-based paths. Flex-algorithm path is represented by just one SID and MPLS label is derived from the SID and downloaded in the MPLS forwarding table.

IETF (The Internet Engineering Task Force) has published an Internet Draft dated Nov. 12, 2018, and Titled, "IGP Flexible Algorithm draft-ietf-lsr-flex-algo-01.txt" specifies a way of using Segment Routing Prefix-SIDs to steer packets along the constraint-based paths. This document specifies a set of extensions to ISIS, OSPFv2, and OSPFv3 that enable a router to send TLVs that are to be used to compute the best paths along the constrained topology. This document also specifies a way for a router to use IGPs to associate one or more Segment Routing Prefix-SIDs with a particular Flex-Algorithm. Each such Prefix-SID then represents a path that is computed according to the identified Flex-Algorithm. A given combination of calculation-type, metric-type and constraints is known as a "Flexible Algorithm Definition". A router that sends such a set of TLVs also assigns a specific value, Flex-Algorithm, to the specified combination of calculation-type, metric-type and constraints.

However, like any IGP shortest path tree calculation is limited to a single area, the flex algorithm calculation as per this document is also limited to a single area. In particular, this document specifies that the egress L1/L2 router (ABR in OSPF) will be selected based on the best path for the given Flex-Algorithm in the local area and such egress L1/L2 (ABR in OSPF) router will be responsible to compute the best Flex-Algorithm specific path over the next area. This may produce an end-to-end path, which is sub-optimal based on Flex-Algorithm constraints. If the best end-to-end path for a given Flex-Algorithm needs to be used for inter-area destinations, paths for such destinations need to be computed by the entity that has all the topological information about all areas. The current prescribed solutions require a path computation element (PCE) or any similar external controller for inter-area path computation. The PCE can access information from nodes of all the areas.

In view of the above, there is a need to optimize segment-routing flexible algorithm solutions for inter-area paths without using PCEs.

SUMMARY

This summary is provided to introduce concepts related to a method and a network node for optimal routing in an inter-area IGP network using segment routing-flexible algorithm protocols to identify the best end-to-end paths.

A first aspect of the invention provides a method of optimal routing in an inter-area IGP network using segment routing-flexible algorithm protocols. The inter-area IGP network comprises of a first area and a second area, the first area including a first set of nodes and at least two area border nodes, the second area including a second set of nodes and the at least two area border nodes. The method comprises of advertising, by each of the at least two area border nodes, an algorithm-specific metric associated with a destination node from the first set of nodes to a source node from the second set of nodes. Further, the method comprises of calculating, by the source node, each inter-area path metric associated with a path including a respective area border node to reach the destination node, the each inter-area path metric based on the algorithm specific metric advertised by the respective area border node. Further, the method comprises of determining, by the source node, an optimal path including one of the at least two ABR nodes to reach the destination node based on each of the each calculated inter-area path metric. Further, the method comprises forwarding a packet from the source node to the destination node using the determined path.

A second aspect of the invention provides a method of optimal routing implemented by a source node in an inter-area IGP network using segment routing-flexible algorithm protocols. The inter-area IGP network comprises of a first area and a second area, the first area including a first set of nodes including the source node and at least two area border nodes, the second area including a second set of nodes and the at least two area border nodes. The method comprises of receiving from each of the at least two area border nodes, an algorithm-specific metric associated with a destination node from the first set of nodes. Further, the method comprises of calculating each inter-area path metric associated with a path including a respective area border node to reach the destination node, the each inter-area path metric based on the algorithm specific metric advertised by the respective area border node. Further, the method comprises of determining an optimal path including one of the at least two ABR nodes to reach the destination node based on each of the each calculated inter-area path metric. Further, the method comprises forwarding a packet from the source node to the destination node using the determined path.

A third aspect of the invention provides a method of optimal routing implemented by an area border node in an inter-area IGP network using segment routing-flexible algorithm protocols. The inter-area IGP network comprises of a first area and a second area, the first area including a first set of nodes, the area border node and at least one other area border node, the second area including a second set of nodes, the area border node and the at least one other area border node. The method comprises of advertising an algorithm-specific metric associated with a destination node from the first set of nodes to a source node from the second set of nodes. Based on the algorithm-specific metric advertised by the respective area border node, the source node calculates an inter-area path metric associated with a path from the source node to the destination node and the path including the respective area border node. The method comprises of receiving, from the source node, a packet to be forwarded to the destination node when the path being determined as an optimal path by the source node, and forwarding the packet to the destination node using the determined path. Wherein, the optimal path is determined by the source node is based on the inter-area path metric associated with the path including the respective area border node and each inter-area path metric calculated by the source node, the each inter-area path metric being associated with a path including the at least one other area border node to reach the destination node.

A fourth aspect of the present invention is to provide a source node for optimal routing to a destination node in an inter-area IGP network. The inter-area IGP network comprises a first area and the second area, the first area including a first set of nodes including the source node, and at least two area border nodes, the second area including a second set of nodes including the destination node and the at least two area border nodes. The source node comprises of a receiving unit configured to receive from each of the at least two area border nodes, an advertisement of an algorithm-specific metric associated with the destination node. Further, the source node comprises of a path metric calculation unit configured to calculate, each inter-area path metric associated with a path including a respective area border node to reach the destination node, the each inter-area path metric being based on the algorithm specific metric advertised by the respective area border node. Further, the source node comprises of a path determining unit configured to determine, based on each of the each calculated inter-area path metric, an optimal path including one of the at least two area border nodes to reach the destination node a best path including one of the at least two ABR nodes to reach the destination node. Further, the source node comprises a packet forwarding unit configured to forward a packet from the source node to the destination node using the determined path.

A fifth aspect of the present invention is to provide an area border node for optimal routing in an inter-area IGP network. The inter-area IGP network comprises a first area and the second area, the first area including a first set of nodes, the area border node and at least one other area border node, the second area including a second set of nodes, the area border node and the at least one other area border node. The area border node comprises of a transmitting unit configured to advertise an algorithm-specific metric associated with a destination node from the first set of nodes to a source node from the second set of nodes. Based on the algorithm-specific metric advertised by the respective area border node, the source node calculates an inter-area path metric associated with a path from the source node to the destination node and the path including the respective area border node. The area border node further comprises of a receiving unit configured to receive, from the source node, a packet to be forwarded to the destination node when the path being determined as an optimal path by the source node to reach the destination node. Further, the area border node comprises of a packet forwarding unit configured to forward the packet to the destination node using the determined path. Wherein the optimal path is determined by the source node is based on the inter-area path metric associated with the path including the respective area border node and each inter-area path metric calculated by the source node, the each inter-area path metric being associated with a path including the at least one other area border node to reach the destination node.

BRIEF DESCRIPTION OF THE DRAWINGS

The detailed description is described with reference to the accompanying figures. Apparently, the accompanying figures in the following description show merely some embodiments of the present disclosure.

Figure 1:
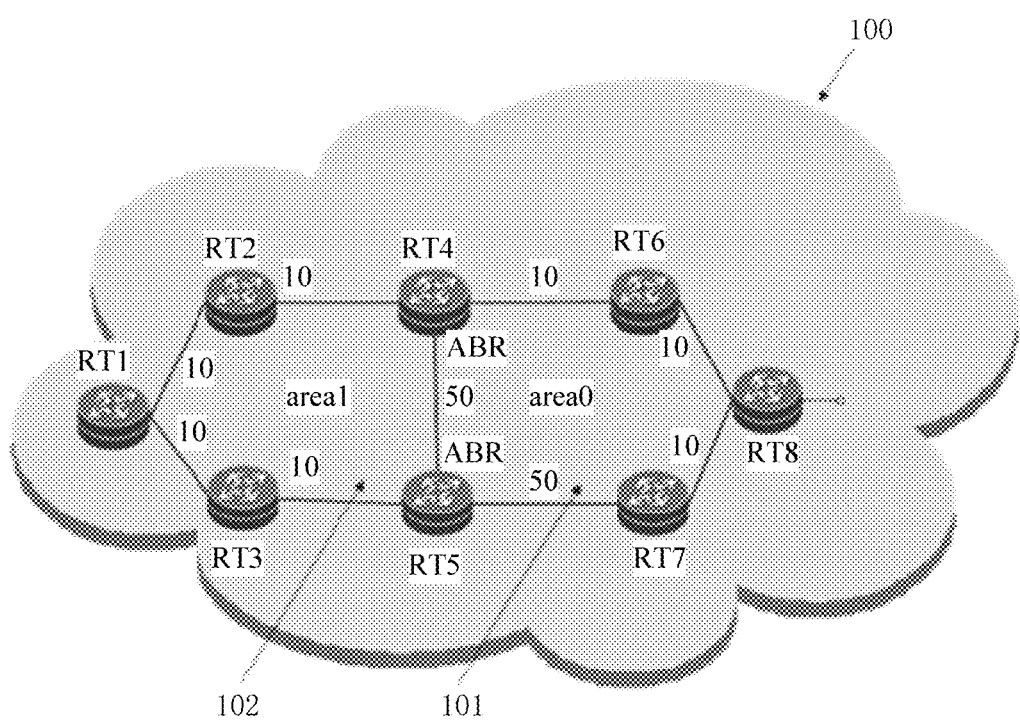
FIG. 1 illustrates a network deployment scenario of SR-MPLS in an inter-area IGP network implementing Flex-algorithm procedures, in accordance with an embodiment of the present invention.

It is to be understood that the attached drawings are for purposes of illustrating the concepts of the invention and may not be to scale.

DETAILED DESCRIPTION OF ILLUSTRATIVE EMBODIMENTS

The invention can be implemented in numerous ways, as a process, an apparatus, a system, a computer-readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Some of the embodiments of the present disclosure are explained with the help of exemplary diagrams and one or more examples, wherever required. However, such exemplary diagrams and examples are provided for the illustration purpose for a better understanding of the present disclosure and should not be construed as a limitation on the scope of the present disclosure.

The technical solutions of the present disclosure may be applicable to an inter-area IGP (Interior Gateway Protocol) based network formed of a first area (also referred to as 'area 0' in the present disclosure) and a second area (also referred to as 'area 1' in the present disclosure). In particular, the present disclosure is directed to the determination of the optimal path or the best path to forward data packets in the Interior Gateway Protocol (IGP) inter-area network.

In accordance with the embodiments of the present invention, the inter-area IGP network deployment uses segment routing (SR)-Multi Protocol Label Switching (MPLS) based traffic engineering to enforce traffic over the best or optimal path using different metrics or constraints. Such paths determined by the constraint-based SR-TE are installed in the forwarding tables of the MPLS.

In accordance with the preferred embodiments of the present invention, the constraints on the topology of said IGP network may be specified by a Flexible Algorithm Definition. The Flexible Algorithm definition is a specified combination of the calculation type, the metric type and the specific constraints which is used to determine the best or optimal path to forward data packets in the IGP network. A node (also referred to as 'router' in this disclosure) participating in the IGP network transmits a message to at least one another node in the intra-area of the IGP network including information specifying the Flexible Algorithm Definition. Such a message is in the form of a set of Type-Length-Value (TLVs) specifying the Flexible Algorithm Definition. The node of the intra-area network also assigns a specific value, termed as 'Flex-Algorithm' when forwarding the set of TLVs to the other nodes in the intra-area network. The specific value is a numeric identifier in the range of 128-255.

Also, the nodes associate one or more SR Prefix-SID (segment identifier) with the particular Flex-Algorithm currently being employed. Each such Prefix-SID then represents a path that is computed according to the identified Flex-Algorithm.

The present disclosure provides technical solutions for enabling identification of the optimal or the best path in the inter-area IGP network without the use of an external controller which is traditionally used in IGP networks deploying SR-MPLS constraints based procedures for computing the best path. The inter-area IGP network comprising of the first area and the second area include a first set of nodes and a second set of nodes respectively, where the first set of nodes in the first area may not have the visibility to the topology of the second set of nodes in the second area. In order to achieve SR-MPLS Flex-Algorithm inter-area optimal paths, the area border nodes, for example, the Area Border Routers (ABR) in OSPF or L2 router in ISIS, advertise/leak Flex-Algorithm' specific metric along with the Flex-Algorithm SID (segment identifier) for a respective destination router (i.e., Prefix or Route), so that the source node in the second area can compute end-to-end optimal path to the prefix SID across area, i.e., to the destination node associated with the prefix SID in the first area, based on the Flex-Algorithm specific metric advertised by the area border node.

To deploy the above proposed technical solution, the present invention also provides a set of extensions to OSPF (Open Shortest Path First) as well as ISIS (Intermediate System to Intermediate System) which are the routing protocols of the inter-area IGP network. The set of extensions to ISIS, OSPFv2, and OSPFv3, which are described in the foregoing sections of the present disclosure, are used by the area border nodes to advertise/leak the Flex-Algorithm metric along with the Flex-Algorithm SID for the respective destination node of one area to the source node of another area. The deployment of the SR-MPLS Flex-Algorithm in the inter-area IGP network in accordance with the described teachings of the present invention shall now be explained by way of illustration shown in FIGS. 1 and 2.

FIG. 1 illustrates a network deployment scenario of SR-MPLS Flex-Algorithm in the inter-area IGP network 100, in accordance with an embodiment of the present invention. The IGP network 100 is formed of a first area, 101, i.e., area 0, and the second area 102, i.e., area 1. The first area, area 0, may be the backbone area, and the second area, area 1 may be the off-backbone area, however the same should not be construed as a limitation to the present invention. An area herein refers to a logical group of networks, routers, and links that have the same area number and may also be referred to as an intra-area. The first area 101 comprises of routers RT8, RT7, RT5, RT4, and RT6, and the second area 102 is formed of routers RT1, RT2, RT4, and RT3. The first area 101 and the second area 102 have common area border routers (ABR) which are routers placed at the border between this first area 101 and the second area 102. In the IGP network 100, RT4 and RT5 are the ABRs.

As explained above, each prefix SID associated with a router or segment relates to an algorithm. Each node of an area advertises its algorithm in a specified format known as SR-Algorithm TLV. The Flex-Algorithm deployed is defined by the operator can include minimization of a specified metric such as IGP cost, delay etc. and/or exclusion of certain link properties. By way of an example, Operator1 defines Flex-Algo128 as "minimize an IGP metric and avoid link-affinity "green" and Operator2 defines Flex-Algo128 as "minimize-delay metric and avoid link-affinity "blue. Each node of an area advertises the Flex-Algo that it is participating in, to the other nodes of the same area. When the node advertises participation in a Flex-Algo it also advertises the associated prefix-SID for that Flex Algo. By way of an example, RT8 in area 0 advertises loopback prefix 81.81.81.81, prefix-SID 81, and algorithm-ID 128(i.e., the defined Flex-Algorithm) to RT6, RT4, RT7, and RT5.

The shortest-path or the best path in the topology of the area of the intra-area of the IGP is a metric defined by the flex-algorithm. The metric can be the IGP metric which is the shortest path computed, the TE metric or the delay. Based on the computed metric, the Prefix-SID associated with the destination is updated in the MPLS forwarding table.

In accordance with the embodiments of the present invention, the ABR leak advertises the metric associated with a destination prefix SID and the defined flex-algorithm to the source nodes of another area, which enable the source nodes to compute the best path in the topology of the inter-area IGP network.

By way of an example, reference is made to FIG. 1 which indicates the configured link-TE metrics between each of the nodes: the link-TE metric between RT8 and RT6 is 10, the link-TE metric between RT8 and RT6 is 10, the link-TE metric between RT6 and RT4 is 10, the link-TE metric between RT4 and RT2 is 10, the link-TE metric between RT2 and RT1 is 10, the link-TE metric between RT8 and RT7 is 10, the link-TE metric between RT7 and RT5 is 50, the link-TE metric between RT5 and RT3 is 10 and the link-TE metric between RT3 and RT2 is 10. Also, the link metric between RT4 and RT5 is indicated to be 50.

All the routers of the inter-area IGP network participate in an algorithm-ID 128. Each of the two ABRs, RT4 and RT5 advertise the algorithm-ID along with the prefix SID and the TE-metric associated with a destination node in the area 0 to the nodes of the area 1.

In a specific example, the destination node is RT8 which is configured with loopback prefix 81.81.81.81, prefix SID 81 and supporting flexible algorithm 128. In order to compute the best inter-area path as per the defined flexible algorithm, ABR RT4 leaks TE-metric 20 to area 1 in order to reach the destination node RT8, i.e., prefix 81.81.81.81. The TE-metric 20 is derived from the hop from RT8 to RT6, with TE-metric-m, and the hop from RT6 to RT4, with TE-metric 10. Similarly, ABR RT5 leaks TE-metric 60 to area 1 in order to reach the destination node RT8, i.e., prefix 81.81.81.81. The TE-metric 60 is derived from the hop from RT8 to RT7, with TE-metric-10, and the hop from RT7 to RT5, with TE-metric 50.

Each router in area 1 uses the leaked SID-metric to calculate inter-area path metric, i.e., the path metric to reach the ABR+metric leaked by the ABR). For instance, RT1 calculates inter-area path metric 40 to reach the prefix 81.81.81.81 via RT4. The inter-area path metric 40 is derived from the metric leaked by the ABR RT4, i.e., 20+TE-metric associated with the hop between RT4 and RT2, i.e. 10+TE-metric associated with the hop between RT2 and RT1. Similarly, RT1 calculates inter-area path metric 80 to reach the prefix 81.81.81.81 via RT5. The inter-area path metric 80 is derived from the metric leaked by the ABR RT5, i.e., 60+TE-metric associated with the hop between RT5 and RT3, i.e. 10+TE-metric associated with the hop between RT3 and RT1.

Based on the calculated inter-area path via each of the ABRs, i.e., RT4 and RT5, the source node determines the optimal path or the best path to reach the prefix 81.81.81.81. In the present example, RT1 chooses ABR RT4 to reach prefix 81.81.81.81 based on the cost. Although TE-metric has been used in the present example the same should not be construed as a limitation to the present invention and the determination of the best path is made upon the algorithm-specific metric, which can be for instance delay based or IGP cost.

The optimal path or the best path includes one of the two ABRs, which is RT4 in the present example. Also, the inter-area path metric calculation includes the metrics associated with the one or more hops from the source node to reach the respective chosen ABR. In the present example, the next hop RT2 is chosen by RT1 to reach ABR RT4.

After path determination, the corresponding labels of the routers are derived from the respective SIDs and downloaded in the forwarding table of the RT1 to reach prefix 81.81.81.81. Thereafter, data packets from the source node, i.e., RT1 is forwarded to the destination node, i.e., RT8 using the best path via RT4 in the inter-area IGP network 100. The data packet forwarding uses MPLS routing protocols.

Figure 2:
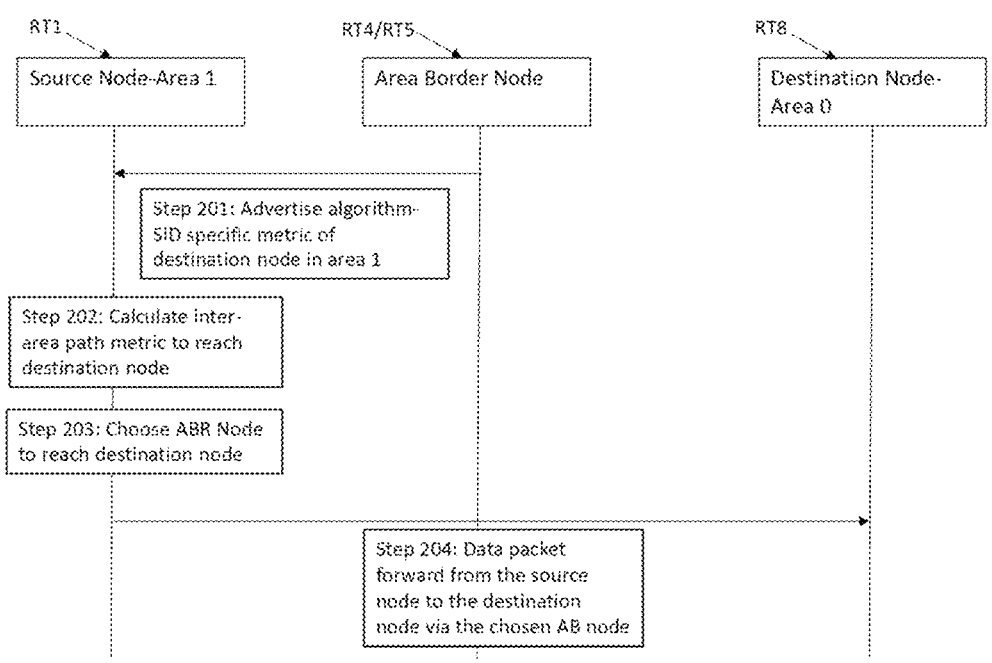
FIG. 2 illustrates a method of packet forwarding in an inter-area IGP network employing SR-MPLS Flex-algorithm procedures, in accordance with an embodiment of the present invention.

FIG. 2 illustrates a flowchart of forwarding data packets from the source node RT1 in area 1 to the destination node RT8 in area 0 via a chosen ABR, i.e., one of the ABR RT4 or ABR 5.

At step 201, the ABR, RT4, and RT5, advertise/leak the algorithm-SID specific metric of a destination node along with prefix-SID of the destination and the algorithm-ID in area 1.

At step 202, the source node RT1 in area 1 calculates a respective inter-area path metric to reach the destination node RT8 based on the leaked information from the respective ABRs.

At step 203, based on the inter-area path metric calculated for each of the respective ABRs, the source node RT1 chooses one of the ABRs, ABR RT4 or ABR RT5, to reach the destination node RT8 where the optimal path or the best path includes the chosen ABR. Also, the next hop by the source node RT1 is chosen based on the chosen ABR and intra-area path metric calculations.

In accordance with the above example, if ABR RT4 is chosen, the ABR RT4 receives, from the source node RT6, the packet to be forwarded to the destination node RT8 when the path including the ABR RT4 is determined as an optimal path or the best path by the source node RT1 to reach the destination node RT8. The optimal path is determined by the source node RT1 based on the inter-area path metric associated with the path including the respective area border node RT4 and each inter-area path metric calculated by the source node RT1, each inter-area path metric being associated with a path including the at least one other ABR RT5 to reach the destination node RT8.

At step 204, data packets are forwarded from the source node to the destination node using the optimal path or the best path via the chosen ABR. In the above example, ABR RT4 receives the packet from the source node RT1 and further forwards the packet to the destination node RT8 using the determined path.

In accordance with further embodiments of the present application, the advertising by the area border nodes to area 1 is in a specified format known as TLV. The message including the TLVs is transmitted from the area border nodes to each of the source nodes of area 1. The present application provides a set of extensions to OSPF (v2 and v3), ISIS that enables the area border nodes to send TLVs in order to advertise the metrics in a manner described above in the inter-area IGP network.

To advertise/leak algorithm-SID-specific metric, this idea proposes extensions in IGP (OSPF and ISIS), details go as below:

a) OSPF Extension: "Prefix SRMPLS Algorithm Metric Sub-TLV".

Encode algorithm-SID metric in a new "SRMPLS Algorithm Metric Sub-TLV" as Sub TLV of "OSPF Extended Prefix TLV" and "OSPFv3 E-Inter-Area-Prefix-LSA TLV".

```
 0                   1                   2                   3
 0 1 2 3 4 5 6 7 8 9 0 1 2 3 4 5 6 7 8 9 0 1 2 3 4 5 6 7 8 9 0 1
-+-+-+-+-+-+-+-+-+-+-+-+-+-+-+-+-+-+-+-+-+-+-+-+-+-+-+-+-+-+-+-+
|        Type            |           Length                    |
-+-+-+-+-+-+-+-+-+-+-+-+-+-+-+-+-+-+-+-+-+-+-+-+-+-+-+-+-+-+-+-+
|    Algorithm |             Reserved                          |
-+-+-+-+-+-+-+-+-+-+-+-+-+-+-+-+-+-+-+-+-+-+-+-+-+-+-+-+-+-+-+-+
|                         Metric                               |
-+-+-+-+-+-+-+-+-+-+-+-+-+-+-+-+-+-+-+-+-+-+-+-+-+-+-+-+-+-+-+-+
```

Where:

'Type' represents a value representing the type of the link-metric used in the calculation which can be an IGP metric, Link Delay or TE metric.

'Length' represents a variable value, dependent on the included sub-TLV

'Algorithm' represents the Flex-algorithm

'Reserved' represents the reserved bits

'Metric' represents the algorithm-specific metric, for example, the TE-metric of the above example shown in FIG. 1 b) ISIS Extension: "Prefix SRMPLS Algorithm Metric Sub-TLV"

Encode algorithm-SID metric in a new "SRMPLS Algorithm Metric Sub-TLV" as Sub TLV of any of the following ISIS TLVs:

TLV-135 (Extended IPv4 Reachability) defined in RFC5305.

TLV-235 (Multi-topology IPv4 Reachability) defined in RFC5120.

TLV-236 (Extended IPv6 Reachability) defined in RFC5308.

TLV-237 (Multi-topology IPv6 Reachability) defined in RFC5120.

```
 0                   1                   2                   3
 0 1 2 3 4 5 6 7 8 9 0 1 2 3 4 5 6 7 8 9 0 1 2 3 4 5 6 7 8 9 0 1
-+-+-+-+-+-+-+-+-+-+-+-+-+-+-+-+-+-+-+-+-+-+-+-+-+-+-+-+-+-+-+-+
|   Type      |   Length    |  Reserved   |  Algorithm         |
-+-+-+-+-+-+-+-+-+-+-+-+-+-+-+-+-+-+-+-+-+-+-+-+-+-+-+-+-+-+-+-+
|                         Metric                               |
-+-+-+-+-+-+-+-+-+-+-+-+-+-+-+-+-+-+-+-+-+-+-+-+-+-+-+-+-+-+-+-+
```

Where:

'Type' represents a value representing the type of the link-metric used in the calculation which can be an IGP metric, Link Delay or TE metric.

'Length' represents a variable value, dependent on the included sub-TLV

'Algorithm' represents the Flex-algorithm

'Reserved' represents the reserved bits

'Metric' represents the algorithm-specific metric, for example, the TE-metric of the above example shown in FIG. 1

Figure 3:
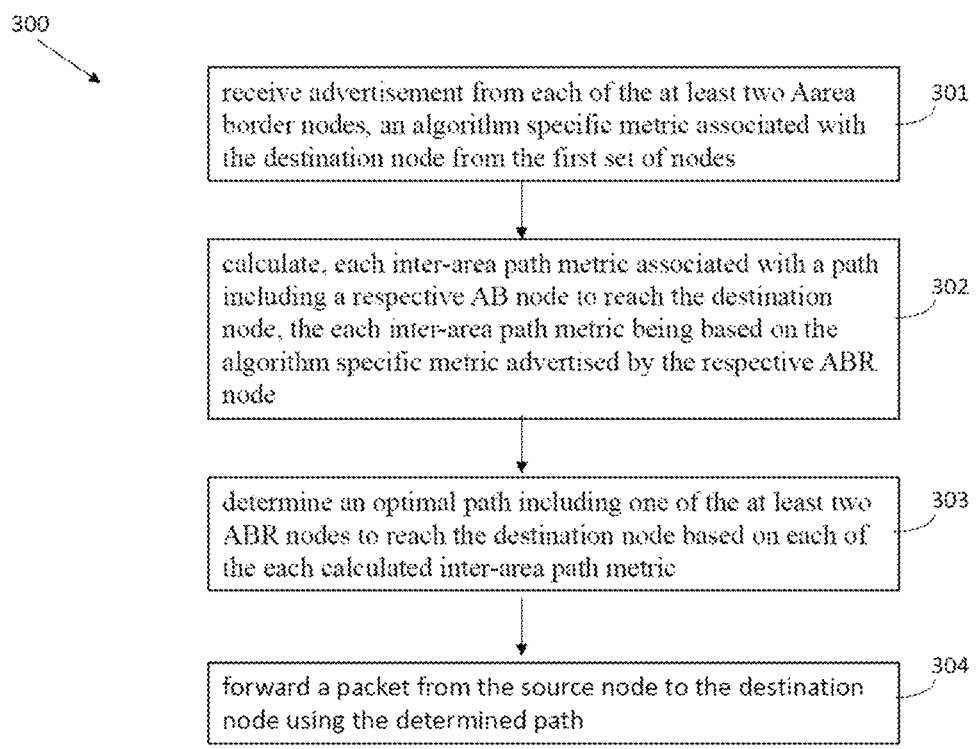
FIG. 3 illustrates a method performed of packet forwarding by a source node in one area to a destination node in another area in an inter-area IGP network employing SR-MPLS Flex-algorithm procedures, in accordance with an embodiment of the present invention.

FIG. 3 represents a method 300 of forwarding data packets in an inter-area IGP network, which may include, for example, the inter-area network 100 formed of the first area 101 and the second area 102, as illustrated in FIG. 1.

At step 301, each of the two area border nodes of the first area 101 and the second area 102 advertises an algorithm specific metric associated with a destination node from the first set of nodes in the first area 101 to the second set of nodes in the second area 102. The area border nodes also advertise the prefix SID of the destination node along with the algorithm-specific metric. The area border nodes may also advertise the flexible algorithm in which the destination node is participating.

In one implementation, all the nodes of the first area 101 and the second area 102 may participate in a predefined flexible algorithm. Further, the first area 101 and the second area 102 may participate in the same predefined flexible algorithm. However, in another implementation, the nodes of the inter-area IGP network may participate in one or more different flexible algorithms.

Further, the area border nodes may use the above-defined formats of TLVs to advertise the prefix SID of the destination node along with the algorithm-specific metric and the algorithm-ID as an extension of OSPFv2, OSPFv3 or ISIS as per the deployment.

The second set of nodes participating in the same predefined Flex-Algorithm receive the advertisement from each of the two area border nodes.

At step 302, one of the nodes from the second set of nodes of the second area 102, i.e., a source node calculates each inter-area path metric associated with a path including a respective area border node to reach the destination node, the each inter-area path metric being based on the algorithm specific metric advertised by the respective area border node. Herein, the path metric calculation via a respective area border node in order to reach the destination node of the other area includes calculation of the link metrics associated with one or more hops in the respective intra-areas. The one or more hops exist between the source node and other nodes from the second set of nodes to reach the respective area border node in the second area 102. Further, one or more hops may also exist in the first area between other nodes between the destination node and the respective area border node. By way of an example, the link-metric advertised by the respective area border node to the source node already includes the calculated link metrics associated with one or more hops between the destination node and the respective area border node from the first area.

At step 303, based each of the calculated inter-area path metrics, the source nodes determine the optimal path or the best path including one of the two area border nodes to reach the destination node. The optimal path or the best path includes the chosen area border node as discussed earlier with reference to FIG. 2.

At step 304, data packets are forwarded from the source node to the destination node using the determined path, i.e., via the chosen area border node.

The above-described solution enables each router of the second area 102 to computer inter-area path metrics in the inter-area IGP network and therefore determine the best end-to-end path across areas by considering the SID-algorithm specific metric leaked by the area border nodes.

Figure 4A:
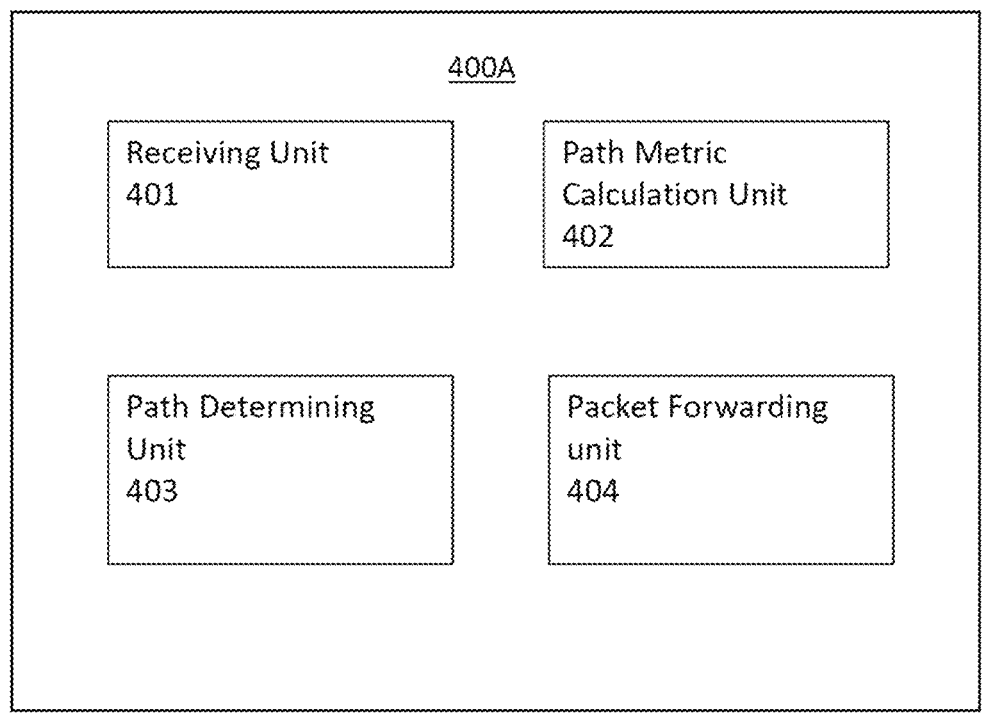
FIG. 4A illustrates a block diagram illustrating components associated with a source device in one area of an inter-area IGP network for packet forwarding to a destination node in another area in the inter-area IGP network employing SR-MPLS Flex-algorithm procedures, in accordance with an embodiment of the present invention.

FIG. 4A illustrates a block diagram of the nodes of the inter-area network 100 shown in FIG. 1. The nodes may include a source node which has to determine the best end-to-end path across areas to reach a destination node in the in the inter-area network in accordance with the SR-MPLS Flex-algorithm procedures. In one implementation, the source node may be one of the routers in the second area and the destination node may be one of the routers in the first area where the area border nodes leak information of the destination node of the first area in the second area. In another implementation, the source node may be one of the routers in the first area and the destination node may be one of the routers in the second area where the area border nodes leak information of the destination node of the second area in the first area.

As illustrated in FIG. 4A, a source node 400 may include components disclosed herein to determine the best end-to-end path in the inter-area network 100 in order to forward data packets to a destination node of the inter-area network 100. It is understood that the source node 400A is in an area, for example, area 1, other than the area of the destination node, for example, area 0. The source node 400 comprises a receiving unit 401, a path metric calculation unit 402, a path determining unit 403 and a packet forwarding unit 404.

The receiving unit 401 is configured to receive the advertisement from each of the at least two ABR nodes, (for example ABR RT4 and ABR RT5 shown in FIG. 1), an algorithm-specific metric associated with the destination node from the first set of nodes in a first area (for example area 0).

The path metric calculation unit 402 is configured to calculate, each inter-area path metric associated with a path including a respective area border node to reach the destination node, each inter-area path metric being based on the algorithm specific metric advertised by the respective ABR node. By way of an example, the path metric calculation is similar to the path metric calculation implemented by RT1 to reach RT8 via each of the ABRs RT4 and RT5, in the example described above with respect to FIG. 1.

The path determining unit 403 is configured to determine the optimal path or the best path including one of the at least two area border nodes to reach the destination node based on each of the each calculated inter-area path metric. In the case of the example described above with respect to FIG. 1, RT1 chooses RT4 and determines the path via the chosen ABR RT4 as the optimal path to forward data packets to RT8 via ABR RT4.

The packet forwarding unit 404 is configured to forward a data packet from the source node to the destination node using the determined path.

The path determining unit 403 updates the labels in the MPLS forwarding table and the packet forwarding unit 404 derives the corresponding labels of the nodes existing in the best path, as determined, from the MPLS forwarding table.

The receiving unit 401, the path metric calculation unit 402, the path determining unit 403 and the packet forwarding unit 404 may be individual components or one component may include one or more of the other components in different implementations. Furthers, one or more or all of these components may be hardware based such as integrated circuit components, or may be implemented as software implemented by an integrated processor of the node 400A, or may be a combination of hardware components and software, as the case may be.

Figure 4B:
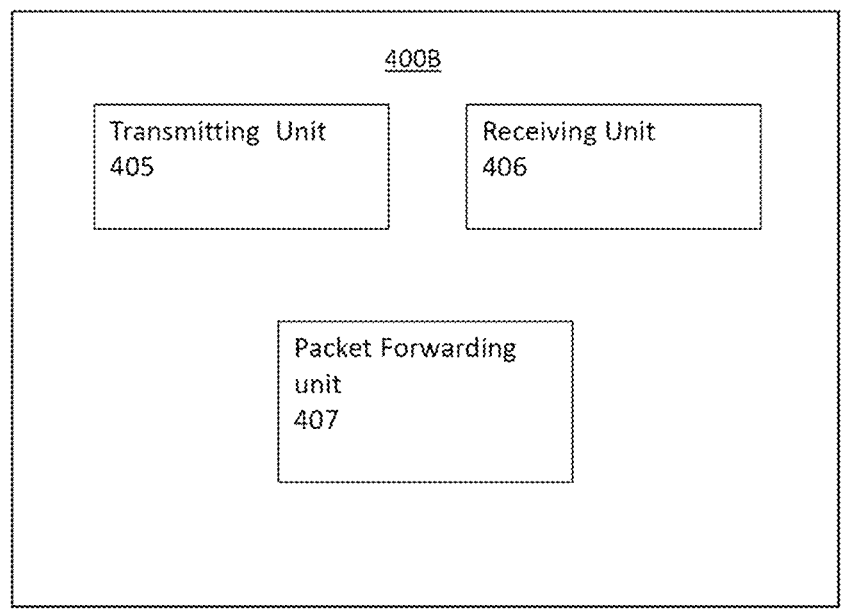
FIG. 4B illustrates a block diagram illustrating components associated with an area border node of an inter-area IGP network for packet forwarding from a source node in one area to a destination node in another area in the inter-area IGP network employing SR-MPLS Flex-algorithm procedures, in accordance with an embodiment of the present invention.

FIG. 4B illustrates a block diagram of an area border node 400B of the inter-area network wo shown in FIG. 1. The area border node may include any of the two area border nodes shown in FIG. 1, i.e. ABR RT4, ABR RT5. The area border node may be the one which is chosen by the source node via which the data packets may be forwarded to the destination node using the optimal path. In accordance with the embodiments of the present invention the source node, the destination node and the area border node may be participating in the same Flex-Algorithm definition.

As illustrated in FIG. 4B, an area border node 400B may include components disclosed herein to facilitate the determination of the best end-to-end path in the inter-area network wo in order to forward data packets from a source node to a destination node of the inter-area network 100. It is understood that the area border node 400B may include any of the at least two area border nodes present between the first area and the second area. The area border node 400B comprises a transmitting unit 405, a receiving unit 406, and a packet forwarding unit 407. In accordance with an embodiment of the present invention, the area border node 400B is the chosen ABR RT4, as explained with respect to FIG. 2

The transmitting unit 405 is configured to advertise an algorithm-specific metric associated with the destination node in area 0 to the source node in area 1. The advertised algorithm specific metric may be received by the first set of nodes in the second area, for example, by the receiving unit 401 of the source node 400A, see FIG. 4A, wherein based on the algorithm-specific metric advertised by the respective area border node, the source node can calculate an inter-area path metric associated with a path from the source node to ten destination node and the path including the respective area border node 400B. The path calculation can be for example be carried out by the path metric calculation unit 402 of the source node 400B, as shown in FIG. 4A.

It is understood that the path calculation unit 402 of the source node 400B calculates the inter-area path metric for the respective area border node 400B and also calculates each inter-area path metric being associated with a path by at least one other area border node. For example, the path metric calculation unit 402 calculates the inter-area path metric based on the metric advertised by ABR RT4 as well as the inter-area path metric based on the metric advertised by ABR RT5.

If after calculating the inter-area path metric for the respective area border node 400B and the other area border node, the path via the area border node 400B is determined as the optimal path, the source node may choose the path via the area border node 400B to forward the data packets to the destination node in the other area.

The receiving unit 406 is configured to receive from the source node a packet to be forwarded to the destination node via the path associated with the metric advertised by the area border node 400B when the path is determined as the optimal path by the source node.

The packet forwarding unit 407 is configured to forward a data packet to the destination node using the determined path.

The transmitting unit 405, the receiving unit 406 and the packet forwarding unit 407 may be individual components or one component may include one or more of the other components in different implementations. Furthers, one or more or all of these components may be hardware based such as integrated circuit components, or may be implemented as software implemented by an integrated processor of the node 400B, or may be a combination of hardware components and software, as the case may be.

Figure 4C:
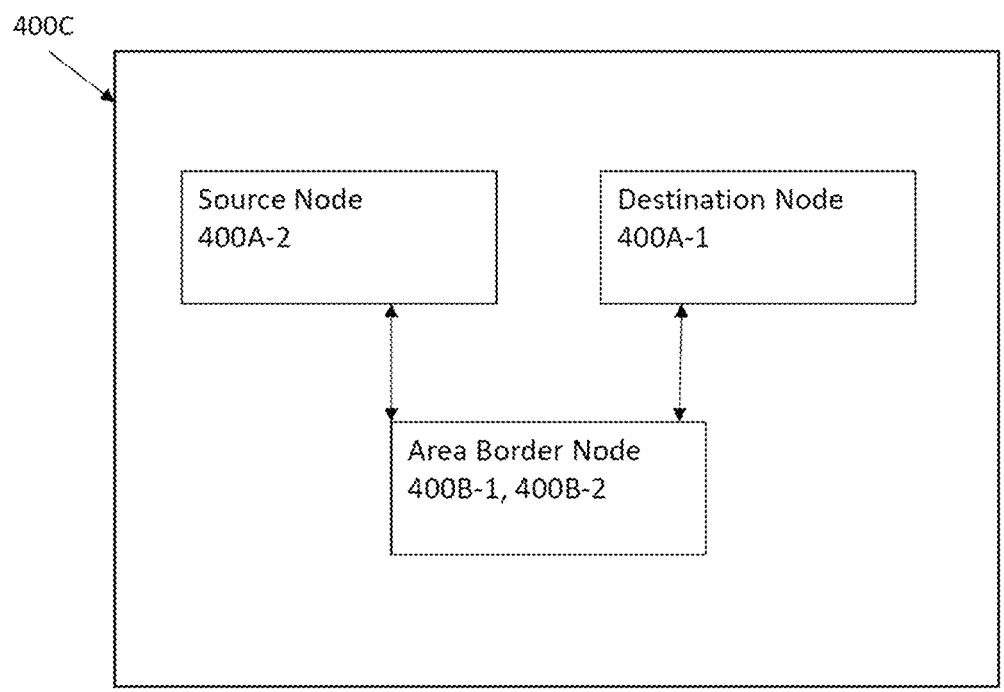
FIG. 4C illustrates a block diagram illustrating components associated with a system for optimal routing in an inter-area IGP network for packet forwarding from a source node in one area to a destination node in another area in the inter-area IGP network employing SR-MPLS Flex-algorithm procedures, in accordance with an embodiment of the present invention.

FIG. 4C illustrates a block diagram of a system 400C in the inter-area network 100 shown in FIG. 1, where the system facilitates .determining the best end-to-end path across areas to reach a node across areas in the inter-area network in accordance with the SR-MPLS Flex-algorithm procedures. The system 400C comprises of a source node 400A-2, and a destination node 400A-1. In one embodiment, the source node 400A-2 and the destination node 400A-1 include the components of the source node 400A showing in FIG. 4A, where A-2 represents the second area and the A-1, represents the first area. By way of an example, with reference to FIG. 1, the source node 400A-2 is RT1 and the destination node 400A-1 is RT8.

Further, the system 400C includes area border nodes, 400B-1 and 400B-2. As explained in the present disclosure, there may be at least two area border nodes and one of the two area border nodes is selected in a path determined by the source node 400A-2 to forward packets to the destination node 400A-1. In one embodiment, the area border nodes 400B-1 and 400B-2 include the components of the area border node 400B shown in FIG. 4B. By way of an example, with reference to FIG. 1, the area border node represented in FIG. 4C includes the ABR RT4, ABR, and RT5 shown in FIG. 1. When the path via the ABR RT4 is determined as the optimal path by the source node 400A-2 to forward packets to the destination node 400A-1, the ABR RT4 represents the area border node to forward the packets to the destination node 400A-1.

In one implementation, the source node may be one of the routers in the second area and the destination node may be one of the routers in the first area where the area border nodes leak information of the destination node of the first area in the second area. In another implementation, the source node may be one of the routers in the first area and the destination node may be one of the routers in the second area where the area border nodes leak information of the destination node of the second area in the first area.

Figure 5:
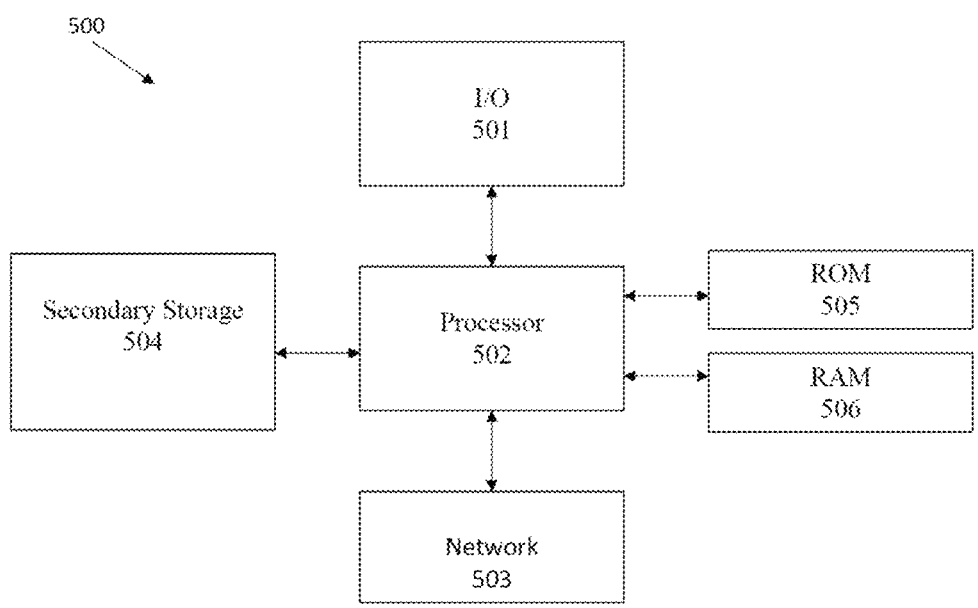
FIG. 5 illustrates a block diagram of a typical general purpose router participating in an inter-area IGP network employing SR-MPLS Flex-algorithm procedures, in accordance with an embodiment of the present invention.

FIG. 5 illustrates additional and/or alternative components of a node 500 participating in the inter-area IGP network 100 as disclosed above. The node 500 includes the first set of a node of the first area and the second set of a node of the second area as well as the ABR nodes forming part of the first area and the second area.

The node 500 may be implemented on any general-purpose network component, such as a computer or network component with sufficient processing power, memory resources, and network throughput capability to handle the necessary workload placed upon it. The node 500 may include at least the routers of the area 0 and the area 1 described with respect to FIG. 1

FIG. 5 illustrates a typical router for implementing one or more embodiments of the components disclosed herein. The node 500 comprises a processor 502 (which may be referred to as a central processor unit or CPU) that is in communication with memory devices including secondary storage 504, read-only memory (ROM) 505, random access memory (RAM) 506, input/output (I/O) devices 501, and network connectivity devices 503. The processor 502 may be implemented as one or more CPU chips or may be part of one or more application specific integrated circuits (ASICs).

In accordance with the embodiments of the present invention, the processor 502 may include one or more of the components, such as the path metric calculation unit 402, the path determining unit 403, the packet forwarding unit 404 of the source node 40 described in FIG. 4.

In accordance with the embodiments of the present invention, the input/output devices 501 may include the receiving unit 401 of the source node 400 shown in FIG. 4. In other embodiments the input/output devices 501 may include a transmission unit or a transceiver to communicate with the other nodes of the IGP network 100. The transmission unit or transceiver may be used to forward data packets as well as to forward the prefix SID to other nodes of the IGP network. In case of the transceiver, the same may be used to receive the prefix SID leaked by other nodes or the ABR as well as forwarded data packets from the other nodes in the IGP network.

The secondary storage 504 is typically comprised of one or more disk drives or tape drives and is used for non-volatile storage of data and as an over-flow data storage device if RAM 506 is not large enough to hold all working data. Secondary storage 504 may be used to store programs that are loaded into RAM 506 when such programs are selected for execution. The ROM 505 is used to store instructions and perhaps data that are read during program execution. ROM 505 is a non-volatile memory device that typically has a small memory capacity relative to the larger memory capacity of secondary storage 504. The RAM 506 is used to store volatile data and perhaps to store instructions. Access to both ROM 505 and RAM 506 is typically faster than to secondary storage 504.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

In the several embodiments provided in the present invention, it should be understood that the disclosed system and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

What is claimed is:

1. A method, comprising:
   advertising, based on an extended inter-area interior gateway protocol (IGP), by each area border node of at least two area border nodes to a source node of a second set of nodes, a Flexible Algorithm (Flex-Algo) metric of the respective area border node that is associated with a path to a destination node of a first set of nodes, to advertise at least two Flex-Algo metrics to the source node, wherein an IGP network comprises a first area and a second area, the first area includes the first set of nodes and the at least two area border nodes, and the second area includes the second set of nodes and the at least two area border nodes;
   calculating, by the source node for each of the at least two Flex-Algo metrics received by the source node, a respective inter-area path metric associated with a corresponding path that passes through a corresponding area border node to reach the destination node, to calculate at least two inter-area path metrics, wherein each respective inter-area path metric is based on the respective Flex-Algo metric advertised by the corresponding area border node;
   determining, by the source node based on each of the at least two calculated inter-area path metrics, an optimal path that includes one area border node of the at least two area border nodes and that reaches the destination node; and
   forwarding a packet from the source node to the destination node using the determined optimal path.

2. The method according to claim 1, wherein each of the at least two inter-area path metric calculations include intra-area path metric calculations of the second area associated with one or more hops from the source node to one or more nodes of the second set of nodes to reach the corresponding area border node.

3. The method according to claim 1, wherein advertising, by each area border node of the at least two area border nodes, the respective Flex-Algo metric of the respective area border node comprises:
   advertising, by each area border node of the at least two area border nodes, a Prefix-SID of the destination node and the respective Flex-Algo metric.

4. The method according to claim 1, wherein the packet is forwarded from the source node to the destination node using the optimal path based on Multi-Protocol Label Switching.

5. The method according to claim 1, wherein the first set of nodes, the second set of nodes, and the at least two area border nodes participate in Flex-Algo, and Flex-Algo is predefined.

6. A method, comprising:
   advertising, based on an extended inter-area interior gateway protocol (IGP), by a first area border node to a source node of a second set of nodes, a Flexible Algorithm (Flex-Algo) metric associated with a first path to a destination node of a first set of nodes, wherein based on Flex-Algo metrics advertised by each of the first area border node and at least one other area border node, the source node calculates, for each Flex-Algo metric of the Flex-Algo metrics received from the first area border node and the at least one other area border node, a respective inter-area path metric associated with a path from the source node to the destination node that includes the corresponding area border node from which the respective Flex-Algo metric is received, to calculate at least two inter-area path metrics, wherein an IGP network comprises a first area and a second area, the first area includes the first set of nodes, the first area border node and the at least one other area border node, and wherein the second area includes the second set of nodes, the first area border node and the at least one other area border node;
   receiving, from the source node, a packet to be forwarded to the destination node when the first path is determined to be an optimal path by the source node; and
   forwarding the packet to the destination node using the first path; and
   wherein the optimal path is determined by the source node based on each of the at least two inter-area path metrics calculated by the source node.

7. The method according to claim 6, wherein each of the at least two inter-area path metric calculations include intra-area path metric calculations of the second area associated with one or more hops from the source node to one or more nodes of the second set of nodes to reach the corresponding area border node.

8. The method according to claim 6, wherein advertising, by the first area border node, the Flex-Algo metric associated with the first path comprises advertising a Prefix-SID of the destination node and the Flex-Algo metric.

9. The method according to claim 6, wherein the packet is forwarded to the destination node using the first path based on Multi-Protocol Label Switching.

10. The method according to claim 6, wherein the first set of nodes, the second set of nodes, the first area border node, and the at least one other area border node participate in Flex-Algo, and Flex-Algo is predefined.

11. A source node, comprising:
    one or more processors; and
    a non-transitory memory, configured to store one or more computer programs, wherein the one or more computer programs comprise instructions which are executable by the one or more processors to cause the source node to:
    receive, based on an extended inter-area interior gateway protocol (IGP), from each of at least two area border nodes, an advertisement of a respective Flexible Algorithm (Flex-Algo) metric associated with a destination node, to receive at least two Flex-Algo metrics from the at least two area border nodes, wherein an IGP network comprises a first area and a second area, the first area includes a first set of nodes including the destination node and the at least two area border nodes, and the second area includes a second set of nodes including the source node and the at least two area border nodes;

calculate, for each received Flex-Algo metric of the at least two Flex-Algo metrics received from the at least two area border nodes, a respective inter-area path metric associated with a corresponding path that passes through a corresponding area border node to reach the destination node, to calculate at least two inter-area path metrics, wherein each respective inter-area path metric is calculated based on the respective Flex-Algo metric advertised by the corresponding area border node;

determine, based on each of the at least two calculated inter-area path metrics, an optimal path that includes one of the at least two area border nodes and that reaches the destination node; and forward a packet from the source node to the destination node using the determined optimal path.

12. The source node according to claim 11, wherein each of the at least two inter-area path metric calculations include intra-area path metric calculations of the second area associated with one or more hops from the source node to one or more nodes of the second set of nodes to reach the corresponding area border node.

13. The source node according to claim 11, wherein forwarding the packet from the source node to the destination node using the determined optimal path is based on Multi-Protocol Label Switching.

14. The source node according to claim 11, wherein the first set of nodes, the second set of nodes, and the at least two area border nodes, participate in Flex-Algo, and Flex-Algo is predefined.

15. The source node according to claim 11, wherein each advertisement received comprises a message transmitted by the corresponding area border node to the source node, the message of each advertisement including a Type Length Value (TLV) indicating the respective Flex-Algo metric of the corresponding area border node, where the TLV is a Sub TLV of open shortest path first (OSPF) Extended Prefix TLV, or a Sub TLV of OSPFv3 E-Inter-Area-Prefix-LSA-TLV.

16. The source node according to claim 11, wherein each advertisement received comprises a message transmitted by the corresponding area border node to the source node, the message of each advertisement including a Type Length Value (TLV) indicating the respective Flex-Algo metric of the corresponding area border node, where the TLV is a Sub TLV of any of the following Intermediate System to Intermediate System (ISIS) TLVs:

an Extended IPV4 Reachability-TLV-135;
a Multi-topology IPV4 Reachability-TLV-235;
an Extended IPV6 Reachability-TLV-236; or
a Multi-topology IPv6 Reachability-TLV-237.

17. A first area border node, comprising:
one or more processors; and
a non-transitory memory, configured to store one or more computer programs, wherein the one or more computer programs comprise instructions which are executable by the one or more processors to cause the first area border node to:

advertise, based on an extended inter-area interior gateway protocol (IGP), to a source node of a second set of nodes, Flexible Algorithm (Flex-Algo) metric associated with first path to a destination node of a first set of nodes, wherein based on Flex-Algo metrics advertised by each of the first area border node and at least one other area border node, the source node calculates, for each received Flex-Algo metric of the Flex-Algo metrics received from the first area border node and the at least one other area border node, a respective inter-area path metric associated with a path from the source node to the destination node that includes the respective area border node, to calculate at least two inter-area path metrics, and wherein an inter-area interior gateway protocol (IGP) network comprises a first area and a second area, the first area includes the first set of nodes, the first area border node and the at least one other area border node, and the second area includes the second set of nodes, the first area border node and the at least one other area border node;

receive, from the source node, a packet to be forwarded to the destination node when the first path is determined to be an optimal path by the source node; and forward the packet to the destination node using the first path; and wherein the optimal path is determined by the source node based on each of the at least two inter-area path metrics calculated by the source node.

18. The first area border node according to claim 17, wherein each of the at least two inter-area path metrics calculated includes intra-area path metric calculations of the second area associated with one or more hops from the source node to one or more nodes of the second set of nodes to reach the corresponding area border node.

19. The first area border node according to claim 17, wherein the first set of nodes, the second set of nodes, the first area border node, and the at least one other area border node participate in Flex-Algo, and Flex-Algo is predefined.

20. The first area border node according to claim 17, wherein the advertisement comprises a message transmitted to the source node, the message includes a Type Length Value (TLV) indicating a Flex-Algo metric of the first area border node, wherein the TLV is a Sub TLV of open shortest path first (OSPF) Extended Prefix TLV, or a Sub TLV of OSPFv3 E-Inter-Area-Prefix-LSA-TLV.

* * * * *

UNITED STATES PATENT AND TRADEMARK OFFICE
CERTIFICATE OF CORRECTION

| | | |
|---|---|---|
| PATENT NO. | : 12,132,639 B2 | Page 1 of 1 |
| APPLICATION NO. | : 17/479129 | |
| DATED | : October 29, 2024 | |
| INVENTOR(S) | : Negi et al. | |

It is certified that error appears in the above-identified patent and that said Letters Patent is hereby corrected as shown below:

In the Specification

In Column 12, Line 34, delete "wo" and insert -- 100 --.

In Column 12, Line 46, delete "wo" and insert -- 100 --.

Signed and Sealed this
Tenth Day of December, 2024

Katherine Kelly Vidal
*Director of the United States Patent and Trademark Office*